United States Patent Office 3,374,212
Patented Mar. 19, 1968

3,374,212
PURIFICATION OF POLYMERIZED OLEFINS PREPARED WITH CATALYSTS CONTAINING VANADIUM COMPOUNDS
Michael J. Marinak and George S. Fujioka, Walnut Creek, Calif., assignors to The Dow Chemical Company, Midland, Mich., a corporation of Delaware
No Drawing. Filed July 12, 1965, Ser. No. 471,432
7 Claims. (Cl. 260—88.2)

This invention relates to a method for treating polymerized olefinic and other ethylenically unsaturated materials which have been prepared with catalysts containing vanadium compounds, and in particular it relates to a method for improving the color of the polymer and the removal of catalyst residues from such products.

Various olefins and other ethylenically unsaturated materials, particularly ethylene, may be efficiently polymerized, even as relatively impure materials, to relatively high molecular weight polymeric compounds at relatively low pressures and temperatures using catalyst compositions first proposed by Karl Ziegler and his associates in Germany. Among the proposed catalyst compositions which are employed as catalysts for the polymerization are mixtures of organo-metallic reducing compounds of the metals of Groups I, II, III of the Periodic system, and in particular Group III–A including various aluminum alkyls and salts of vanadium.

The aluminum alkyls which are advantageously employed in the catalyst mixtures of the Ziegler process include among other compounds the aluminum trialkyls such as aluminum trimethyl, aluminum triethyl, aluminum tripropyl, aluminum triisobutyl and higher aluminum trialkyls as well as dialkyl aluminum halides and dialkyl aluminum hydrides.

Vanadium salts which are employed in the catalyst mixtures include the halogenides, oxyhalogenides, complex halogenides, and such organic compounds as alcoholates, acetates, benzoates, acetyl acetonates and the like.

A particularly active catalyst mixture for the Ziegler process may be obtained by mixing a halide of vanadium such as $VCl_3$ or $VCl_4$ with an aluminum alkyl such as aluminum triethyl.

Amounts of the catalyst admixture varying from 0.01 to a few percent by weight, depending upon the degree of purity of the materials being polymerized, may suitably be employed.

Using these catalyst compositions high molecular weight polymers are prepared by polymerizing olefin monomers or mixture of monomers at temperatures below 200° C. and under pressures less than about 100 atmospheres. It is preferable when employing such catalysts according to the Ziegler process in solution polymerizations to operate at temperatures between about 120° and 175° C. and under pressures between about 5 to about 40 atmospheres. The reaction may suitably be conducted in the presence of an organic solvent such as hexane, benzene and the like.

After polymerization according to the Ziegler process, however, polyethylene and similar polymerized products contain catalytically active residues from the admixed metallic catalyst employed and the polymeric product oftentimes has a dark gray or blue color.

The presence of color in the polymer product is disadvantageous for the achromic character of a polymer is of considerable importance in determining the usefulness and acceptability of olefin polymers as film and fiber forming materials. The presence of the catalyst residues is disadvantageous, for if they are not removed from the polymer, degradation and further discoloration of the polymer will occur when the polymer is heated as when it is melt fabricated.

Various treating methods have been proposed and tried by the prior art to overcome one or both of these problems, such as washing the polymer with water, alcohols, acids, or caustic solutions e.g. U.S. Patents 2,699,457, 2,886,561, and 2,890,214. U.S. Patent 2,827,-445 teaches pretreating the polymer with an oxidizing agent such as lauroyl peroxide followed by the addition of a fatty acid to remove the catalyst residues.

While these methods of treating the polymerization products are effective in removing a substantial portion of the residues from the products, a certain amount of such residues remain which in the case of vanadium constituents are colored and impart an undesirable appearance to the polymer.

According to the present invention colored vanadium constituents in catalyst residues contained in a polymer of an olefin compound polymerized with a catalyst formed by admixing an organo-metallic reducing compound with a reducible vanadium compound are effectively removed by a process which comprises first treating the polymer containing said catalyst residues with an amount of an oxidizing agent sufficient to oxidize the vanadium constituent to the vanadium V state and then converting the oxidized vanadium constituent to the colorless vanadate salt form by treatment with a solution of an alkaline compound at a pH of about 9 to about 14.

It is a critical feature of the present invention that the vanadium containing catalyst residues be treated with a solution of the oxidizing agent at a pH below 9. If this limitation is not observed, a colored vanadium hydroxide $[V(OH)_3]$ forms which is insoluble and will not readily oxidize to the colorless vanadium V state. The oxidation of the vanadium III state under any condition is not a very rapid reaction and consequently the pH during the oxidation state must be low enough to minimize the conversion of the vanadium III state constituent to the colored $V(OH)_3$. For these reasons, if a continuous treating process is employed it is essential that the oxidation of the vanadium III constituent be first completed in a separate first stage at a relatively low pH i.e. about 4 to about 9 followed by a second stage treatment with an alkaline reagent at a higher pH i.e. about 9 to about 14 to convert the oxidized constituent to the vanadate salt form. If a batch process is employed oxidation of the catalyst residues may be accomplished in a solution containing the oxidizing reagent maintained at a low pH followed, after oxidation, by the addition of additional alkaline reagent to raise the pH to 9 or more.

Oxidizing agents which may be used in the practice of the invention include alkali nitrites, persulfates, peroxides and hypochlorites such as sodium nitrite, potassium nitrite, sodium persulfate, potassium persulfate, sodium and potassium peroxide, sodium and potassium hypochlorite, hydrogen peroxide, and hydroxylamine hydrochloride.

Suitable alkaline compounds which may be employed in the process of the present invention include alkali metal hydroxides such as sodium and potassium hydroxide, alkaline nitrogenous compounds such as concentrated ammonia, ammonium hydroxide, and aliphatic and alicyclic amines such as propyl amine, diethyl amine, trimethyl amine and cyclohexyl amine and tetramethyl guanidine.

The amount of oxidizing agent which should be added in the practice of the present invention is not critical although to insure that all of the vanadium compounds present in the catalyst residue are oxidized to the vanadium V state, the amount of oxidizing agent employed preferably should be appreciably in excess of stoichiometric requirements. Hence, it is preferred for best results that the quantity of oxidizing agent added should be at least two times, on an equivalent basis, the total amount of vanadium present in the catalyst system.

The process of the present invention may be practiced under atmospheric pressure or in a continuous process at pressures ranging from about 120 to about 400 pounds per square inch and at temperatures ranging from about 130 to about 250° C.

After treatment according to the process of the present invention the polymer may be purified and finished in any desired manner. For instance, it may be separated from the alkaline solution and heated to remove diluent and to recover dry polymer. Or it may be formed into a slurry in water, alcohol, acetone or other suitable liquid from which the polymer may be separated by settling or filtration.

Polymeric products treated in accordance with the process of the present invention have enhanced and more desirable color characteristics when employed for shaped and molded articles in comparison with polymers which are prepared using the conventionally practiced purifying aftertreatments following the Ziegler process.

In order to further illustrate the invention but without restricting it thereto, the following examples are given.

*Example 1*

A copolymer comprised of 87 percent by weight ethylene and 13 percent by weight of mixed $C_6$–$C_7$ alphaolefins was prepared according to the herein described Ziegler process by polymerizing a mixture of the monomers in the presence of an admixed aluminum triethyl and vanadium trichloride catalyst. The polymerization reaction was conducted in a commercially available solvent comprised of mixed saturated hydrocarbons boiling between about 110 and 150° C., in which the resultant copolymer was soluble.

The solution was heated to 165° C. to remove unreacted ethylene and contained 11.4 percent by weight polymer solids. The catalyst residues were then extracted in a two stage mixer-settler system.

In the first stage, the polymer solution was passed into a mixing apparatus containing an aqueous solution of NaOH having a pH of 8.5, and containing 0.05 percent by weight $NaNO_2$. The mixture of solutions was agitated for 2 minutes at 156° C. at a gauge pressure of 230 p.s.i. After being agitated, the solutions were allowed to stand and separate. The separated polymer solution was passed to a second mixing apparatus containing an aqueous solution of NaOH having a pH of 12. The mixture of solutions was agitated in the second mixer for 2 minutes at 161° C. and a gauge pressure of 235 p.s.i. After being agitated, the solutions were allowed to stand and separate. The separated polymer solution was removed from the vessel and heated to 270° C. to remove the hydrocarbon solvent and to recover the copolymer product. About 13.3 pounds per hour of copolymer was produced. The volume ratio of aqueous sodium hydroxide solution to polymer solution in both mixing stages was 1.03/1.00.

The color of the dried copolymeric product was white. Analysis of the dried product showed that it contained 9 parts per million (p.p.m.) vanadium.

By way of contrast the procedure described above was substantially repeated with the exception that the aqueous sodium hydroxide solution used in the first stage of the mixer-settler system did not contain $NaNO_2$ and the pH of the aqueous sodium hydroxide solution used in the second stage of the mixer-settler system was maintained at a value of 9. The dried polymer obtained by this procedure was dark gray-blue in color and was found by analysis to contain 39 p.p.m. vanadium.

By way of further contrast, the procedure described above was substantially repeated with the exception that the aqueous sodium hydroxide solution used in the first stage of the mixer-settler system did not contain $NaNO_2$ and the pH was maintained at a value of 12. The dried polymer obtained by this procedure was light gray-blue in color and was found by analysis to contain 55 p.p.m. vanadium.

*Example 2*

A copolymer comprised of 85 percent by weight ethylene and 15 percent by weight of mixed $C_6$–$C_7$ alpha olefins was prepared using an aluminum triethyl/vanadium trichloride catalyst following the procedure of Example 1.

After evaporation of unreacted monomer, the copolymer solution was found to contain 11.9 percent by weight polymer solids. The catalyst residues were then extracted in a two-stage mixer-settler following the procedure of Example 1 with the exception that an aqueous solution of NaOH having a pH of 8.5 and containing 0.05 percent by weight hydroxylamine hydrochloride was substituted for the NaOH solution containing $NaNO_2$.

The color of the dried copolymeric product was white. Analysis of the dried product showed that it contained 5 p.p.m. vanadium.

*Example 3*

A copolymer comprised of 80 percent by weight ethylene and 20 percent by weight of propylene was prepared using an aluminum triethyl/vanadium trichloride catalyst following the procedure of Example 1.

After evaporation of unreacted monomer the polymer solution was found to contain 10.5 percent by weight polymer solids. The catalyst residues were then extracted in a two-stage mixer-settler following the procedure of Example 1 with the exception that an aqueous solution of NaOH having a pH of 8.5 and containing 0.01 percent by weight sodium hypochlorite was substituted for the NaOH solution containing $NaNO_2$.

The color of the dried copolymeric product was white. Analysis of the dried product showed that it contained 4 p.p.m. vanadium.

Since certain changes and modifications in the practice of the present invention can readily be entered into without substantially departing from its spirit and scope, it is to be understood that all the foregoing description be construed as being merely illustrative of the invention.

What is claimed is:

1. A process for removing colored vanadium constituents in catalyst residues contained in a polymer of an olefinic compound polymerized with a catalyst formed by admixing an organo-metallic reducing compound with a reducible vanadium compound, which process comprises first treating the polymer containing said catalyst residues with a solution of an oxidizing agent at a pH below 9 in an amount sufficient to oxidize the vanadium constituent to the vanadium V state and then converting the oxidized vanadium constituent to the vanadate salt form with a solution of an alkaline compound at a pH between about 9 to about 14.

2. The process of claim 1 wherein the polymer is first treated with an oxidizing agent at a pH between about 4 and about 9.

3. The process of claim 1 wherein the vanadium constituent in the catalyst residue is $VCl_3$.

4. The process of claim 1 wherein the oxidizing agent is sodium nitrite.

5. The process of claim 1 wherein the oxidizing agent is hydroxylamine hydrochloride.

6. The process of claim 1 wherein the oxidizing agent is sodium hypochlorite.

7. The process of claim 1 wherein the alkaline compound is sodium hydroxide.

References Cited

UNITED STATES PATENTS 3,112,299  11/1963  Borrows et al.
3,114,742  12/1963  Solvik et al.

JOSEPH L. SCHOFER, *Primary Examiner.*

L. E. EDELMAN, *Assistant Examiner.*